Figure 1:
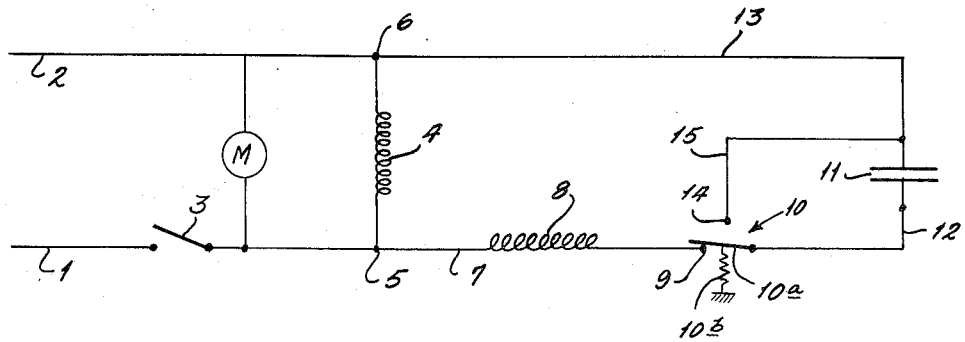

July 2, 1957     E. W. BAUER     2,798,192
DEVICE FOR ELIMINATING NOISE AND VIBRATION IN
DYNAMOELECTRIC MACHINES
Filed Jan. 9, 1956

INVENTOR
EARL W. BAUER
BY Gravely Lieder, Woodruff and Willis
ATTORNEYS.

2,798,192
Patented July 2, 1957

2,798,192

DEVICE FOR ELIMINATING NOISE AND VIBRATION IN DYNAMOELECTRIC MACHINES

Earl W. Bauer, Pagedale, Mo., assignor to Wagner Electric Corporation, St. Louis, Mo., a corporation of Delaware Application January 9, 1956, Serial No. 557,945

10 Claims. (Cl. 318—221)

The present invention relates generally to devices for eliminating noise and vibration in dynamoelectric machines and more particularly to a novel device for eliminating noise and vibration that heretofore occurred in capacitor start motors after being disconnected from the power source while rotating.

Devices have been heretofore constructed for capacitor start motors and the like which centrifugally disconnect the starting circuit including the starting capacitor when the motor or like machine is rotating above a predetermined speed. However, the known devices permitted electrical energy to be stored in the starting circuit and to be dissipated through the machine windings after the machine is de-energized. Such a current surge reacts undesirably on the windings of the machine and produces noise and vibration. This undesirable current surge is well known in the art and is referred to as "the generator effect."

Briefly, the present invention teaches the use of a device for eliminating noise and vibration in dynamoelectric machines caused by the generator effect and comprises a machine having a starting winding in parallel with a running winding, a starting capacitor connected in series with the starting winding, a speed responsive switch and a low impedance shunt circuit connected to said speed responsive switch and adapted to be connected across the starting capacitor for dissipating any energy stored therein when the rotational speed of the machines exceeds a predetermined value.

It is an object of the present invention to provide a device for capacitor start motors and like machines which substantially instantaneously dissipates the energy stored in the starting circuit of the machine as soon as the machine reaches a predetermined rotational speed.

Another object of the invention is to provide a device for capacitor start motors and like machines which eliminates machine noise and vibration during slow down and stopping by preventing energy from being stored in the machine while operating above a predetermined speed.

Another object of the invention is to provide a device for capacitor start motors and like machines which is very inexpensive to construct and yet which completely and continuously dissipates the electric energy stored in the machine during starting so long as the machine operates above a predetermined speed.

Still another object of the present invention is to provide a device for capacitor start motors and like machines which can be adjusted to dissipate energy stored up in the starting circuit of the motor at a preselected dissipation rate.

Other objects and advantages of the present invention will become apparent hereinafter after considering the following detailed specification and the accompanying drawing.

Figure 2:
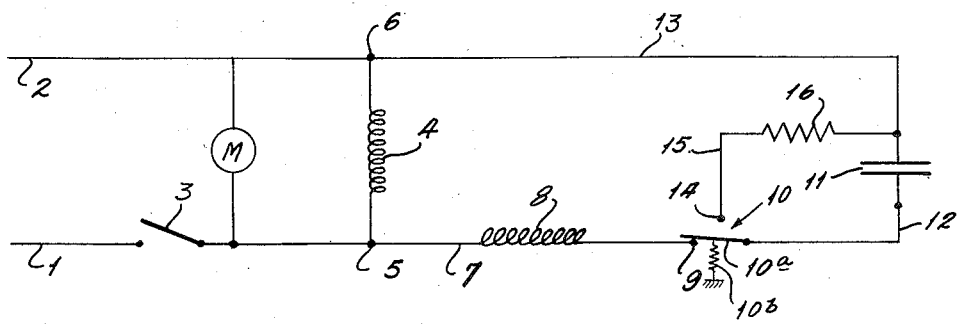

In the drawing:

Fig. 1 is a schematic wiring diagram for a capacitor-start motor including a noise and vibration eliminating device constructed according to the teachings of the present invention, and Fig. 2 is a schematic wiring diagram of a capacitor-start motor showing a modified noise and vibration eliminating device.

Referring to the drawing more particularly by reference numbers, the numbers 1 and 2 refer to two input leads which connect a dynamoelectric machine M to a source of power (not shown). The machine M is energized by the source of power when line switch 3 connected in the line 1 is closed.

The machine M includes a running winding 4 which is connected across the input leads 1 and 2 at machine terminals 5 and 6 respectively. Also connected to the terminal 5 is a lead 7 which is connected to one side of a starting or phase winding 8. The starting winding 8 is connected at its opposite side to a stationary terminal 9 of a speed responsive centrifugal switch 10. The centrifugal switch 10 includes a movable switch blade 10a which when the machine is de-energized or running at very low speeds, is urged into engagement with the stationary terminal 9 by means of a biasing spring 10b.

The switch blade 10a is connected to one side of starting capacitor 11 by a lead 12. The opposite side of the capacitor 11 is connected by lead 13 to the motor terminal 6, and therefore to the load lead 2.

The side of the capacitor 11 which is connected to the lead 13 is also connected to another stationary terminal 14 on the centrifugal switch 10, through a lead 15 (Fig. 1). The stationary terminal 14 and the lead 15 are particularly important to the present invention. The transfer switch blade 10a of the centrifugal switch 10 is biased out of engagement with the stationary terminal 14 when the machine M is de-energized or running at very slow speeds. When the machine speed increases sufficiently for the centrifugal switch 10 to operate, the movable blade 10a moves away from the stationary terminal 9 and into engagement with the stationary terminal 14. As soon as the blade 10a makes contact with the terminal 14, a short circuit is established between the plates of the capacitor 11 and any charge that may have been stored on the capacitor 11 during starting is substantially instantaneously dissipated therethrough.

In the modified circuit shown in Fig. 2, instead of connecting the stationary terminal 14 directly with the capacitor 11, the lead 15 is provided with a low impedance or resistor 16. The resistor 16 usually has a low resistance value so that a very short time interval is required to completely dissipate or discharge the energy stored on the capacitor 11. The resistor 16 also increases the life of the stationary terminal 14 and the blade 10a by reducing arcing when these members make contact.

Operation

In Figs. 1 and 2 the machine is shown in the inoperative or de-energized position with the power switch 3 open and with the switch blade 10a in engagement with the stationary terminal 9. As soon as the switch 3 is closed, there are two parallel motor circuits available across the input leads 1 and 2. One of the circuits is through the running winding 4 which circuit remains in effect as long as the starting switch 3 is closed. The other parallel circuit available at starting time is called the starting circuit and includes the starting winding 8, the engaged stationary terminal 9, the transfer blade 10a, and the starting capacitor 11.

The energized capacitor 11 causes a phase shift between the current energizing the running winding 4 and the current that energizes the starting winding 8. This phase shift is well known in the art, and provides the necessary torque to start the machine M.

As the rotational speed of the machine M increases, a predetermined speed is reached at which time the centrifugal switch blade 10a overcomes the tension of the spring 10b and transfers from engagement with the terminal 9 to engagement with the terminal 14.

When the switch blade 10a moves out of engagement with the terminal 9, it opens the parallel starting circuit across the line leads 1 and 2. So long as the blade 10a remains out of engagement with the terminal 9, current can not flow through the starting winding 8. This condition continues so long as the machine M rotates at sufficient speed to keep the switch blade 10a transferred.

During starting, the capacitor 11, being in series with the starting winding 8, stores up energy on its plates. When the switch blade 10a engages the terminal 14 a short circuit is provided across the capacitor 11. This short circuit consists of the lead 15, the terminal 14, the switch blade 10a and the lead 12, and causes the energy stored in the capacitor 11 during starting to be dissipated almost instantaneously. This dissipation occurs as soon as the machine M develops sufficient rotation speed to transfer the switch blade 10a into engagement with the terminal 14 and so long as the machine continues to run above the switch transfer speed, the capacitor 11 remains discharged for the two-fold reason that the starting circuit is open and the capacitor 11 is shorted. Thus, the undesirable generator effect is completely eliminated by the present device.

When the switch 3 is opened, the rotational speed decreases until the centrifugal switch is restored to its de-energized position in engagement with the contact 9. However, with the machine de-energized and the starting capacitor 11 completely discharged there is no stored-up energy available to produce the generator effect.

The substantially instantaneous dissipation of the charge on the capacitor 11 is particularly desirable in cases where the machine M is to be energized and de-energized frequently for short time intervals. In such cases the capacitor's ability to store energy for long intervals is morel likely to exceed the duration of the individual cycles of operation and it is more important that the capacitor be rapidly discharged. The short circuiting of the capacitor 11, as taught by the present invention, does not, however, affect the operational or starting characteristics of the machine.

A modification of the above described device is shown in Fig. 2. The principal difference between the devices of Figs. 1 and 2 is that the device shown in Fig. 2 includes the resistance 16 in series with the dissipation circuit of the capacitor 11. Preferably the resistor 16 should have a low resistance. When the capacitor 11 is shorted, as described above, the surge of current resulting therefrom may be very large. In such cases the low resistance resistor 16 helps to prevent arcing or even welding of the contact members in the centrifugal switch 10. In most cases, however, the inherent resistance of the switch 10 itself are ample to satisfactorily prevent arcing and/or welding. Obviously, the use of the low resistance resistor 16 does not otherwise affect the operational characteristics of the machine. Furthermore, if the resistance of the resistor 16 is too large the capacitor 11 may not always have time to fully dissipate its charge during short intervals of operation.

It is now apparent that there has been provided a novel device for eliminating noise and vibration in dynamoelectric machines due to a generator effect, which fulfills all of the objects and advantages sought therefor.

The foregoing description and accompanying drawing have been presented only by way of illustration and example, and changes and alterations in the present disclosure, which will be readily apparent to one skilled in the art, are contemplated as within the scope of the present invention which is limited only by the claims which follow.

What I claim is:

1. In a dynamoelectric machine, a main winding; input leads adapted to connect the main winding to a source of energy; an auxiliary starting winding, a switch and a capacitor connected in series across the main winding; a low resistance shunting circuit including a normally open portion of said switch connected across the capacitor, said switch being responsive to the rotational speed of the machine for connecting and disconnecting the starting winding from the source of energy and for connecting and disconnecting the low resistance shunting circuit across the capacitor.

2. In a dynamoelectric machine, a main winding, means for energizing and de-energizing the main winding, an auxiliary starting winding, a switch and a capacitor connected in series across the main winding so as to be energized coincidentally therewith, a short circuit shunt lead having one end connected to one side of the capacitor and another end thereof connected to a normally open contact on the switch, said switch being responsive to the machine speed for connecting and disconnecting the starting winding from the energizing means and for connecting and disconnecting said short circuit shunt lead across the capacitor.

3. In a capacitor start motor in combination, a main circuit; an auxiliary circuit for starting purposes; and means for energizing and de-energizing both of said circuits; said auxiliary circuit comprising in series connection a phase winding, a speed responsive switch and a capacitor, the combination of which is connected across the main circuit; and a capacitor discharge circuit including a low impedance element, said speed responsive switch operating independently in response to motor speed to open and close the auxiliary circuit and to open and close the capacitor discharge circuit, said capacitor discharge circuit affecting substantially instantaneous discharge of the capacitor after the auxiliary circuit has been opened, whereby the motor is prevented from acting as a self-excited generator after being disconnected from the energizing means.

4. In a dynamoelectric machine having a running field winding and a starting field winding; a starting capacitor adapted to be connected in series with the starting field winding and the series combination thereof connected across the running field winding; switching means in series with the starting field winding including a movable speed responsive switch blade, a first stationary terminal engageable by the movable switch blade when the machine is operating below a predetermined speed, and a second stationary terminal engageable by the movable switch blade when the machine is operating above a predetermined speed; and a low impedance capacitor shunt circuit connected to said second stationary terminal, said second stationary terminal engaging said movable switch blade to connect the capacitor shunt circuit across the starting capacitor.

5. In combination in a condenser start motor; a main circuit having a main winding therein; an auxiliary circuit having a starting winding, a condenser, and a speed responsive switching device in series, the series combination thereof being connected in parallel with the main circuit; and a low impedance circuit connected to said switching device for shunting across the condenser, said switching device responding to motor speeds above a predetermined speed for opening the auxiliary circuit and for connecting said low impedance circuit across the condenser.

6. In combination in a condenser start motor; a main circuit having a main winding therein; an auxiliary circuit having a starting winding and a condenser connected in series therein, the combination thereof being connected across the main circuit; a low resistance shunt circuit having one end thereof connected to one side of the condenser; and a speed responsive switching device having a normally closed portion thereof connected into the auxiliary circuit and a normally open portion thereof connected to the free end of the low resistance shunt circuit, said switching device being movable between a position in which the normally closed portion thereof is operative in responsive to motor speeds below a predetermined value for operation of the auxiliary circuit and a position in which the normally open portion thereof is operative for connecting the low resistance shunt circuit across the condenser in response to motor speeds above a predetermined value.

7. In a condenser start motor, a main winding, a phase winding, means for energizing and de-energizing both of said windings, a condenser in series with said phase winding, a low resistance discharge circuit adapted to be shunted around the condenser, and switch means responsive to motor speed for disconnecting the phase winding and for connecting the low resistance discharge circuit around the condenser.

8. In a condenser start motor, a main winding, a phase winding, means for energizing and de-energizing both of said windings, a condenser and a first portion of a speed responsive switch connected in series with the phase winding, and a low resistance discharge circuit including a second portion of the speed responsive switch adapted to be shunted across the condenser for dissipating energy stored therein after the phase winding circuit has been interrupted.

9. In a condenser start motor having two terminals adapted to be connected to a source of electric energy; a running winding and a starting winding connected in parallel across said two motor terminals; a condenser in circuit with the starting winding, a switch having a normally closed portion in series with the starting winding, a low impedance shunt circuit and a normally open portion of said switch shunted across the condenser, and centrifugal switch actuator means responsive to the motor speed for opening the normally closed portion of the switch to interrupt the starting winding circuit and for closing the normally open switch portion shunting the condenser for dissipating energy stored in the condenser through the low impedance shunt circuit.

10. In a dynamoelectric machine, a main winding; input leads adapted to connect the main winding to a source of energy; an auxiliary starting winding, a switch and a capacitor connected in series across the main winding; a shunting circuit including a normally open portion of said switch connected across the capacitor, said switch being responsive to the rotational speed of the machine for connecting and disconnecting the starting winding from the source of energy and for connecting and disconnecting the shunting circuit across the capacitor.

References Cited in the file of this patent

UNITED STATES PATENTS

| | | |
|---|---|---|
| 2,033,047 | Morrill | Mar. 3, 1936 |
| 2,300,708 | Sleeter | Nov. 3, 1942 |

FOREIGN PATENTS

| | | |
|---|---|---|
| 442,561 | Great Britain | Feb. 11, 1936 |